(12) United States Patent
Lee et al.

(10) Patent No.: US 11,659,206 B2
(45) Date of Patent: May 23, 2023

(54) VIDEO ENCODING METHOD WITH SYNTAX ELEMENT SIGNALING OF GUARD BAND CONFIGURATION OF PROJECTION-BASED FRAME AND ASSOCIATED VIDEO DECODING METHOD AND APPARATUS

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 93 days.

(21) Appl. No.: 16/917,917

(22) Filed: Jul. 1, 2020

(65) Prior Publication Data
US 2021/0006838 A1    Jan. 7, 2021

Related U.S. Application Data

(60) Provisional application No. 62/954,814, filed on Dec. 30, 2019, provisional application No. 62/903,056, filed on Sep. 20, 2019, provisional application No. 62/870,139, filed on Jul. 3, 2019, provisional application No. 62/869,627, filed on Jul. 2, 2019.

(51) Int. Cl.
*H04N 19/70*     (2014.01)
*H04N 19/184*   (2014.01)

(52) U.S. Cl.
CPC ........... *H04N 19/70* (2014.11); *H04N 19/184* (2014.11)

(58) Field of Classification Search
CPC ..... H04N 19/70; H04N 19/184; H04N 19/597
USPC .................................................. 375/240.01
See application file for complete search history.

(56) References Cited

U.S. PATENT DOCUMENTS

| | | | |
|---|---|---|---|
| 10,404,960 B2 | 9/2019 | Budagavi | |
| 10,841,566 B2 | 11/2020 | He | |
| 2017/0280126 A1 | 9/2017 | Van der Auwera | |
| 2018/0103242 A1 | 4/2018 | Budagavi | |
| 2018/0130175 A1* | 5/2018 | Lin | ........................ G06T 15/10 |
| 2018/0192001 A1 | 7/2018 | Boyce | |
| 2018/0192074 A1 | 7/2018 | Shih | |

(Continued)

FOREIGN PATENT DOCUMENTS

| | | |
|---|---|---|
| CN | 109246422 A | 1/2019 |
| CN | 109417632 A | 3/2019 |

(Continued)

OTHER PUBLICATIONS

Ya-Hsuan Lee et al., CE13: Modified Cubemap Projection in JVET-J0019 (Test 5), Joint Video Experts Team (JVET) of ITU-T SG 16 WP 3 and ISO/IEC JTC 1/SC 29/WG 11, Document: JVET-K0131-v1, 11th Meeting: Ljubljana, SI, Jul. 10-18, 2018, pp. 1-5.

(Continued)

*Primary Examiner* — On S Mung
(74) *Attorney, Agent, or Firm* — Winston Hsu

(57) ABSTRACT

A video decoding method includes: decoding a part of a bitstream to generate a decoded frame, and parsing at least one syntax element from the bitstream. The decoded frame is a projection-based frame that includes projection faces packed in a cube-based projection layout. At least a portion of a 360-degree content of a sphere is mapped to the projection faces via cube-based projection. The at least one syntax element is indicative of a guard band configuration of the projection-based frame.

15 Claims, 9 Drawing Sheets

(56) References Cited

U.S. PATENT DOCUMENTS

| | | |
|---|---|---|
| 2018/0268517 A1 | 9/2018 | Coban |
| 2019/0005683 A1 | 1/2019 | Van Der Auwera |
| 2019/0026858 A1 | 1/2019 | Lin |
| 2019/0158815 A1 | 5/2019 | He |
| 2019/0191203 A1 | 6/2019 | Asbun |
| 2019/0200023 A1 | 6/2019 | Hanhart |
| 2019/0215532 A1 | 7/2019 | He |
| 2019/0289316 A1 | 9/2019 | Shih |
| 2020/0045336 A1 | 2/2020 | Xiu |
| 2020/0092582 A1 | 3/2020 | Xiu |
| 2020/0260063 A1 | 8/2020 | Hannuksela |
| 2020/0322632 A1 | 10/2020 | Hanhart |
| 2021/0014472 A1 | 1/2021 | He |

FOREIGN PATENT DOCUMENTS

| | | |
|---|---|---|
| CN | 110521204 A | 11/2019 |
| KR | 10-2019-0013379 A | 2/2019 |
| TW | 201921950 A | 6/2019 |
| WO | 2017/205648 A1 | 11/2017 |
| WO | 2018/035721 A1 | 3/2018 |
| WO | 2018/045108 A1 | 3/2018 |
| WO | 2018/064967 A1 | 4/2018 |
| WO | 2018/066983 A1 | 4/2018 |
| WO | 2018/093851 A1 | 5/2018 |
| WO | 2018/184528 A1 | 10/2018 |
| WO | 2018/218028 A1 | 11/2018 |
| WO | 2019/062714 A1 | 4/2019 |
| WO | 2019/074265 A1 | 4/2019 |
| WO | 2019/083943 A1 | 5/2019 |
| WO | 2019/194573 A1 | 10/2019 |
| WO | 2020/069058 A1 | 4/2020 |

OTHER PUBLICATIONS

"International Search Report" dated Sep. 29, 2020 for International application No. PCT/CN2020/099863, International filing date:Jul. 2, 2020.

"International Search Report" dated Sep. 30, 2020 for International application No. PCT/CN2020/099888, International filing date:Jul. 2, 2020.

"International Search Report" dated Oct. 12, 2020 for International application No. PCT/CN2020/099847, International filing date:Jul. 2, 2020.

Xuchang Huangfu et al., Parallel-to-Axis Uniform Cubemap Projection for Omnidirectional Video, 2019 IEEE International Symposium on Circuits and Systems (ISCAS), May 26-29, 2019, Sapporo, Japan, IEEE, pp. 1-5.

Ya-Hsuan Lee et al., AHG6/AHG9:Signalling guard band type for generalized cubemap projection, Joint Video Experts Team (JVET) of ITU-T SG 16 WP 3 and ISO/IEC JTC 1/SC 29/WG 11, 17th Meeting: Brussels, BE, Jan. 7-17, 2020, Document:JVET-Q0343-v1, pp. 1-7, sections 1-3.

Robert Skupin et al., AHG6: 360-degree video related SEI messages, Joint Video Experts Team (JVET) of ITU-T SG 16 WP 3 and ISO/IEC JTC 1/SC 29/WG 11, 16th Meeting: Geneva, CH, Oct. 1-11, 2019, Document:JVET-P0462-v1, pp. 1-2, section 2.

"International Search Report" dated Mar. 25, 2021 for International application No. PCT/CN2020/141395, International filing date:Dec. 30, 2020, pp. 1-10.

Yan Ye et al., Algorithm descriptions of projection format conversion and video quality metrics in 360Lib Version 9, Joint Video Exploration Team(JVET) of ITU-T SG 16 WP 3 and ISO/IEC JTC 1/SC 29/WG 11, 13th Meeting: Marrakech, MA, Jan. 9-18, 2019, JVET-M1004, Jan. 9, 2019.

* cited by examiner

| gcmp_packing_type | gcmp_guard_band_boundary_exterior_flag | Location of guard band (Specification I) |
|---|---|---|
| 0 | 0 |  |
| 0 | 1 |  |

| gcmp_packing_type | gcmp_guard_band_boundary_exterior_flag | Location of guard band (Specification 1) |
|---|---|---|
| 1 | 0 | |
| 1 | 1 | |
| 2 | 0 | |
| 2 | 1 | |
| 3 | 0 | |
| 3 | 1 | |

FIG.5

| gcmp_packing_type | gcmp_guard_band_boundary_exterior_flag | Location of guard band (Specification I) |
|---|---|---|
| 4 | 0 | 0 1 2 3 4 |
| 4 | 1 | 0 1 2 3 4 |
| 5 | 0 | 0 1 2 3 4 |
| 5 | 1 | 0 1 2 3 4 |

Hemisphere cubemap projection

FIG. 6

| gcmp_packing_type | gcmp_guard_band_boundary_exterior_flag | Location of guard band (Specification II) |
|---|---|---|
| 0 | 0 |  |
| 0 | 1 |  |

FIG. 8

| gcmp_packing_type | gcmp_guard_band_boundary_exterior_flag | Location of guard band (Specification II) |
|---|---|---|
| 1 | 0 | |
| 1 | 1 | |
| 2 | 0 | |
| 2 | 1 | |
| 3 | 0 | |
| 3 | 1 | |

| gcmp_packing_type | gcmp_guard_band_boundary_exterior_flag | Location of guard band (Specification II) |
|---|---|---|
| 4 | 0 | |
| 4 | 1 | |
| 5 | 0 | |
| 5 | 1 | |

Hemisphere cubemap projection

FIG. 9

VIDEO ENCODING METHOD WITH SYNTAX ELEMENT SIGNALING OF GUARD BAND CONFIGURATION OF PROJECTION-BASED FRAME AND ASSOCIATED VIDEO DECODING METHOD AND APPARATUS

CROSS REFERENCE TO RELATED APPLICATIONS

This application claims the benefit of U.S. provisional application No. 62/869,627 filed on Jul. 2, 2019, U.S. provisional application No. 62/870,139 filed on Jul. 3, 2019, U.S. provisional application No. 62/903,056 filed on Sep. 20, 2019, and U.S. provisional application No. 62/954,814 filed on Dec. 30, 2019. The entire contents of related applications, including U.S. provisional application No. 62/869,627, U.S. provisional application No. 62/870,139, U.S. provisional application No. 62/903,056, and U.S. provisional application No. 62/954,814, are incorporated herein by reference.

BACKGROUND

The present invention relates to video encoding and video decoding, and more particularly, to a video encoding method with syntax element signaling of a guard band configuration of a projection-based frame and associated video decoding method and apparatus.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by projection faces arranged in a 360-degree Virtual Reality (360 VR) projection layout, and then the resulting frame is encoded into a bitstream for transmission. If a configuration of the employed 360 VR projection layout is fixed without allowing any adjustments made thereto, the video encoder has less flexibility for encoding the 360-degree image content. Thus, there is a need for a flexible design which is allowed to determine/select a guard band configuration of a projection-based frame and signal syntax element (s) associated with the guard band configuration of the projection-based frame.

SUMMARY

One of the objectives of the claimed invention is to provide a video encoding method with syntax element signaling of a guard band configuration of a projection-based frame and associated video decoding method and apparatus.

According to a first aspect of the present invention, an exemplary video decoding method is disclosed. The exemplary video decoding method includes: decoding a part of a bitstream to generate a decoded frame, wherein the decoded frame is a projection-based frame that comprises projection faces packed in a cube-based projection layout, and at least a portion of a 360-degree content of a sphere is mapped to the projection faces via cube-based projection; and parsing at least one syntax element from the bitstream, wherein the at least one syntax element is indicative of a guard band configuration of the projection-based frame.

According to a second aspect of the present invention, an exemplary electronic device is disclosed. The exemplary electronic device includes a decoding circuit. The decoding circuit is arranged to decode apart of a bitstream to generate a decoded frame, and parse at least one syntax element from the bitstream. The decoded frame is a projection-based frame that comprises projection faces packed in a cube-based projection layout. At least a portion of a 360-degree content of a sphere is mapped to the projection faces via cube-based projection. The at least one syntax element is indicative of a guard band configuration of the projection-based frame.

According to a third aspect of the present invention, an exemplary video encoding method is disclosed. The exemplary video encoding method includes: encoding a projection-based frame to generate a part of a bitstream, wherein at least a portion of a 360-degree content of a sphere is mapped to projection faces via cube-based projection, and the projection-based frame has the projection faces packed in a cube-based projection layout; and signaling at least one syntax element via the bitstream, wherein the at least one syntax element is indicative of a guard band configuration of the projection-based frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4-6 are diagrams illustrating one specification of a combination of two syntax elements according to an embodiment of the present invention.

FIGS. 7-9 are diagrams illustrating another specification of a combination of two syntax elements according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
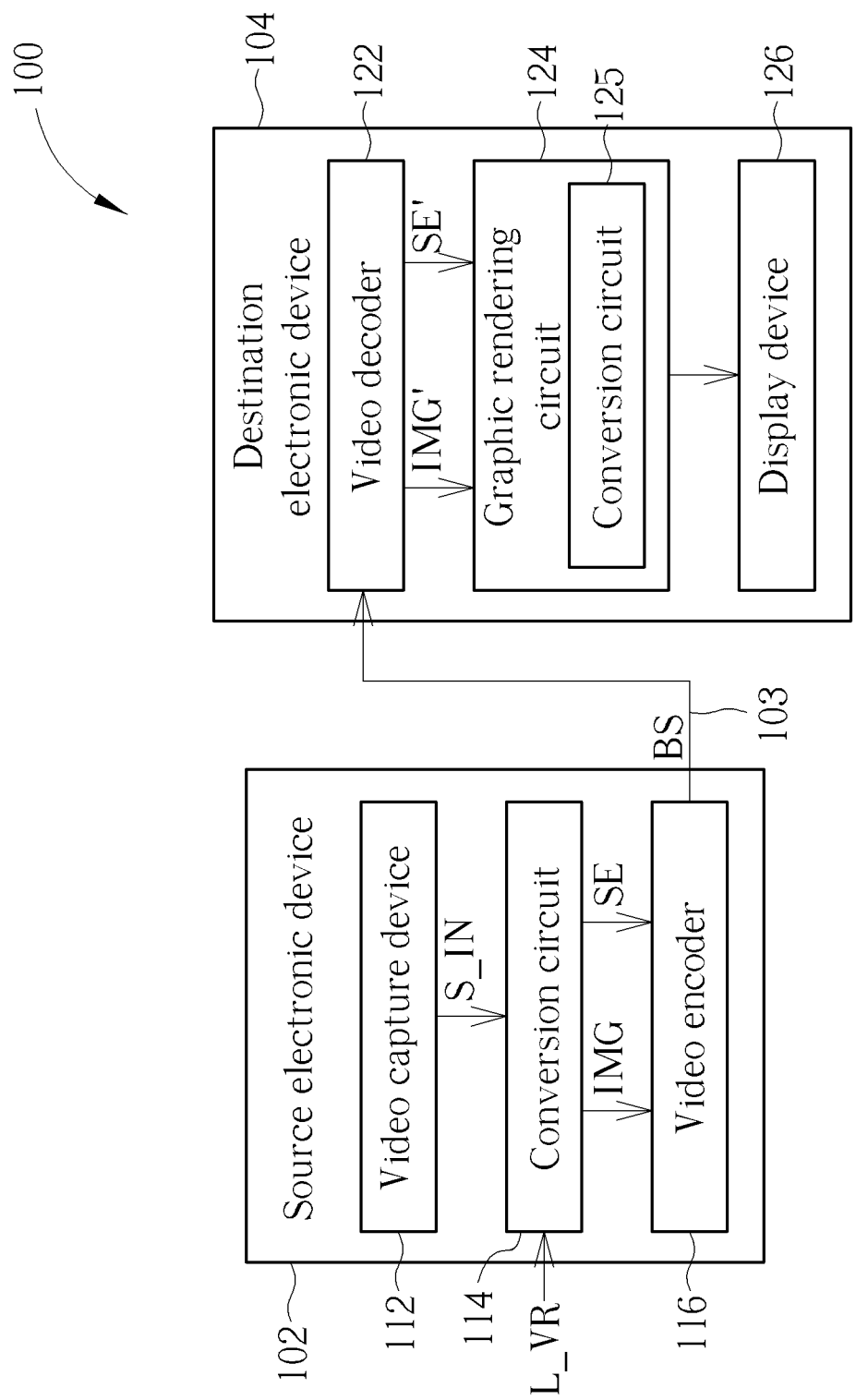
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree content of the sphere. The video encoder 116 is an encoding circuit that encodes the projection-based frame IMG (which has projection faces packed in the 360 VR projection layout L_VR) to generate a part of a bitstream. BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the projection-based frame IMG to be encoded by the video encoder 116 has a 360 VR projection layout L_VR. Hence, after a part of the bitstream. BS is decoded by the video decoder 122, the decoded frame (i.e., reconstructed frame) IMG' has the same 360 VR projection layout L_VR. In other words, the decoded frame IMG' is also a projection-based frame that has projection faces packed in the 360 VR projection layout L_VR. The graphic rendering circuit 124 is arranged to drive the display device 126 to show an image content of a viewport area selected by a user. The graphic rendering circuit 124 may include a conversion circuit 125 that is arranged to process a portion of the image content carried by the decoded frame IMG' for obtaining pixel data associated with the image content of the selected viewport area.

In this embodiment, the 360 VR projection layout L_VR is a cube-based projection layout. Hence, at least a portion (i.e., part or all) of a 360-degree content of a sphere is mapped to projection faces via cube-based projection, and the projection faces derived from different faces of a three-dimensional object (e.g., a cube or a hemisphere cube) are packed in the two-dimensional cube-based projection layout that is employed by the projection-based frame IMG/decoded frame IMG'.

Figure 2:
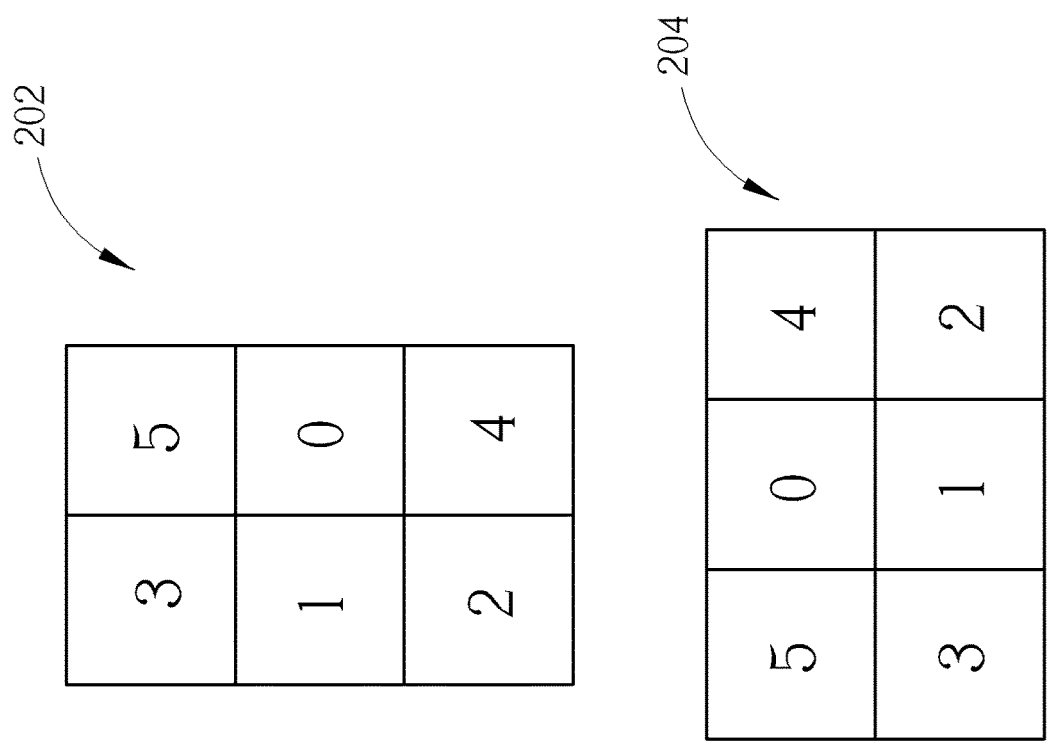
FIG. 2 is a diagram illustrating a cube-based projection according to an embodiment of the present invention.
Figure 2:
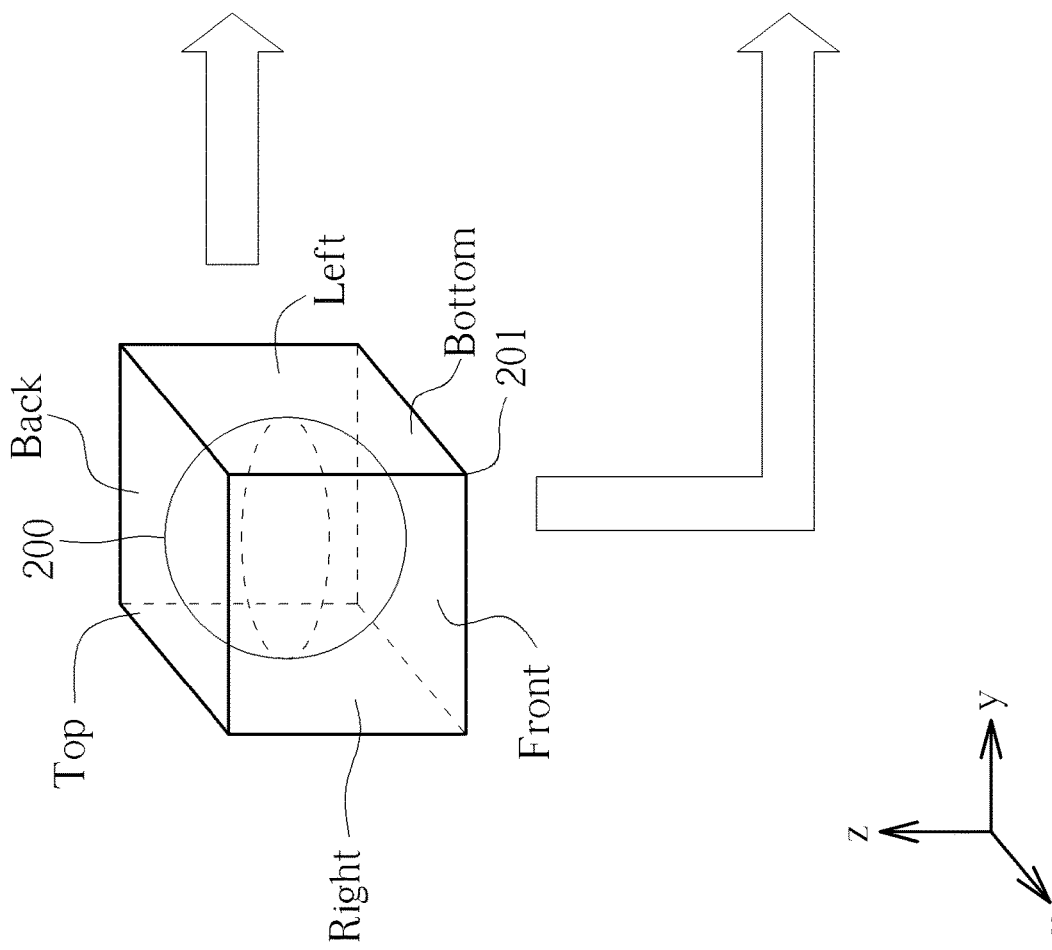

In one embodiment, cube-based projection with six square projection faces representing full 360°×180° omnidirectional video (i.e., all of a 360-degree content of a sphere) may be employed. Regarding the conversion circuit 114 of the source electronic device 102, cube-based projection is employed to generate square projection faces of a cube in a three-dimensional (3D) space. FIG. 2 is a diagram illustrating a cube-based projection according to an embodiment of the present invention. The whole 360-degree content on the sphere 200 is projected onto six square faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

In the 3D space that is defined by x-axis, y-axis, and z-axis, each point on six projected faces is located at (x, y, z), where $x,y,z \in [-1,1]$. In this example shown in FIG. 2, the front face "Front" is on an x-plane with x=1, the back face "Back" is on an x-plane with x=−1, the top face "Top" is on a z-plane with z=1, the bottom face "Bottom" is on a z-plane with z=−1, the left face "Left" is on a y-plane with y=1, and the right face "Right" is on a y-plane with y=−1. In an alternative design, the front face "Front" may be on an x-plane with x=1, the back face "Back" may be on an x-plane with x=−1, the top face "Top" may be on a y-plane with y=1, the bottom face "Bottom" may be on a y-plane with y=−1, the right face "Right" may be on a z-plane with z=1, and the left face "Left" may be on a z-plane with z=−1.

Forward transformation is used to transform from the 3D space (x, y, z) to the 2D plane (u, v). Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane. Each face is on one 2D plane defined by u-axis and v-axis, and has each point located at (u, v).

Inverse transformation is used to transform from the 2D plane (u, v) to the 3D space (x, y, z). Hence, the top face (labeled by "2"), the bottom face (labeled by "3"), the left face (labeled by "5"), the front face (labeled by "0"), the right face (labeled by "4"), and the back face (labeled by "1") on the 2D plane are transformed into the top face "Top", bottom face "Bottom", left face "Left", front face "Front", right face "Right", and back face "Back" of the cube 201 in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the conversion circuit 125 of the destination electronic device 104, forward transformation is used to transform from the 3D space (x, y, z) to the 2D plane (u, v) for determining pixel values of pixels in any of the top face "Top", bottom face "Bottom", left face "Left", front face "Front", right face "Right", and back face "Back". Or the inverse transformation is used to transform from the 2D space (u, v) to the 3D plane (x, y, z) for remapping the sample locations of a projection-based frame to the sphere.

As mentioned above, the top face "2", bottom face "3", left face "5", front face "0", right face "4", and back face "1" are packed to form the projection-based frame IMG. For example, the conversion circuit 114 may select one packing type, such that the projection-based frame IMG may have projected image data arranged in the cube-based projection layout 202. For another example, the conversion circuit 114 may select another packing type, such that the projection-based frame IMG may have projected image data arranged in the cube-based projection layout 204 that is different from the cube-based projection layout 202.

Figure 3:
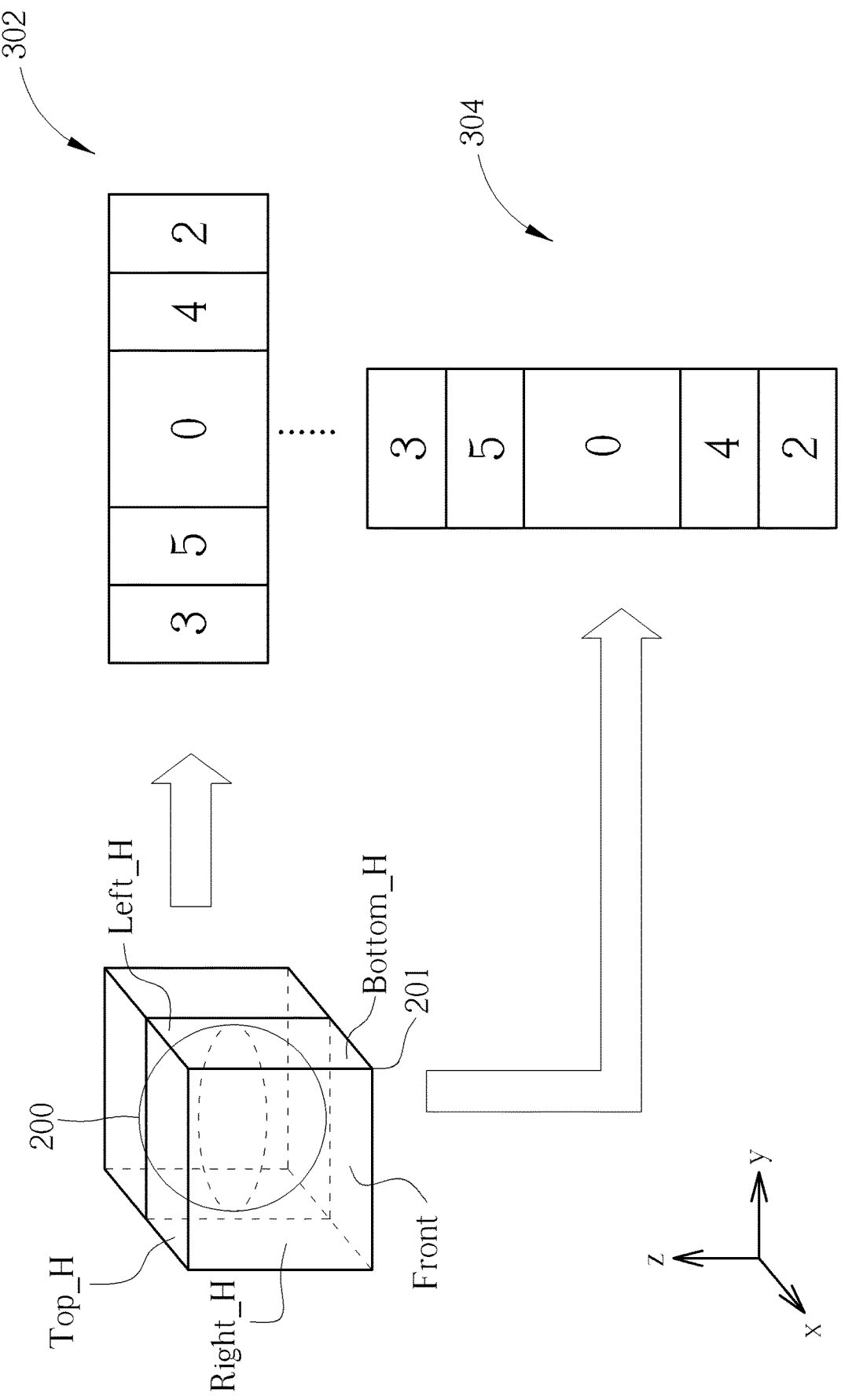
FIG. 3 is a diagram illustrating another cube-based projection according to an embodiment of the present invention.

In another embodiment, cube-based projection with five projection faces (which include one full face and four half faces) representing 180°×180° omnidirectional video (i.e., part of a 360-degree content of a sphere) may be employed. Regarding the conversion circuit 114 of the source electronic device 102, cube-based projection is employed to generate one full face and four half faces of a cube in a 3D space. FIG. 3 is a diagram illustrating another cube-based projection according to an embodiment of the present invention. Only a half of the 360-degree content on the sphere 200 is projected onto faces of a cube 201, including a top half face (labeled by "Top_H"), a bottom half face (labeled by "Bottom_H"), a left half face (labeled by "Left_H"), a front full face (labeled by "Front"), and a right half face (labeled by "Right_H"). In this example, a hemisphere cube (e.g., a half of the cube 201) is employed for hemisphere cubemap projection, where a hemisphere (e.g., a half of the sphere 200) is inscribed in the hemisphere cube (e.g., half of the cube 201). As shown in FIG. 3, an image content of a half of a north polar region of the sphere 200 is projected onto the top half face "Top_H", an image content of a half of a south polar region of the sphere 200 is projected onto the bottom half face "Bottom_H", and an image content of a half of an equatorial region of the sphere 200 is projected onto the left half face "Left_H", the front full face "Front", and the right half face "Right_H".

In the 3D space that is defined by x-axis, y-axis, and z-axis, each point on five projected faces is located at (x, y, z), where x,y,z∈[−1,1]. In this example shown in FIG. 3, the front full face "Front" is on an x-plane with x=1, the top half face "Top_H" is on a z-plane with z=1, the bottom half face "Bottom_H" is on a z-plane with z=−1, the left half face "Left_H" is on a y-plane with y=1, and the right half face "Right_H" is on a y-plane with y=−1. In an alternative design, the front full face "Front" may be on an x-plane with x=1, the top half face "Top_H" may be on a y-plane with y=1, the bottom half face "Bottom_H" may be on a y-plane with y=−1, the right half face "Right_H" may be on a z-plane with z=1, and the left half face "Left_H" may be on a z-plane with z=−1.

Forward transformation is used to transform from the 3D space (x, y, z) to the 2D plane (u, v). Hence, the top half face "Top_H", bottom half face "Bottom_H", left half face "Left_H", front full face "Front", and right half face "Right_H" of the cube 201 in the 3D space are transformed into a top half face (labeled by "2"), a bottom half face (labeled by "3"), a left half face (labeled by "5"), a front full face (labeled by "0"), and a right half face (labeled by "4") on the 2D plane. Each face is on one 2D plane defined by u-axis and v-axis, and has each point located at (u, v). In addition, a size of the front full face (labeled by "0") is twice as large as a size of each of top half face (labeled by "2"), bottom half face (labeled by "3"), left half face (labeled by "5"), and right half face (labeled by "4").

Inverse transformation is used to transform from the 2D plane (u, v) to the 3D space (x, y, z). Hence, the top half face (labeled by "2"), the bottom half face (labeled by "3"), the left half face (labeled by "5"), the front full face (labeled by "0"), and the right half face (labeled by "4") on the 2D plane are transformed into the top half face "Top_H", bottom half face "Bottom_H", left half face "Left_H", front full face "Front", and right half face "Right_H" of the cube 201 in the 3D space.

The inverse transformation can be employed by the conversion circuit 114 of the source electronic device 102 for generating the top half face "2", bottom half face "3", left half face "5", front full face "0", and right half face "4". The top half face "2", bottom half face "3", left half face "5", front full face "0", and right half face "4" on the 2D plane are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the conversion circuit 125 of the destination electronic device 104, forward transformation is used to transform from the 3D space (x, y, z) to the 2D plane (u, v) for determining pixel values of pixels in any of the top half face "Top_H", bottom half face "Bottom_H", left half face "Left_H", front full face "Front", and right half face "Right_H". Or the inverse transformation is used to transform from the 2D space (u, v) to the 3D plane (x, y, z) for remapping the sample locations of a projection-based frame to the sphere.

As mentioned above, the top half face "2", bottom half face "3", left half face "5", front full face "0", and right half face "4" are packed to form the projection-based frame IMG. For example, the conversion circuit 114 may select one packing type, such that the projection-based frame IMG may have projected image data arranged in the cube-based projection layout 302. For another example, the conversion circuit 114 may select another packing type, such that the projection-based frame IMG may have projected image data arranged in the cube-based projection layout 304 that is different from the cube-based projection layout 302. In this embodiment, the front face is selected as the full face that is packed in the cube-based projection layout 302/304. In practice, the full face packed in the cube-based projection layout 302/304 may be any of the top face, the bottom face, the front face, the back face, the left face, and the right face, and the four half faces packed in the cube-based projection layout 302/304 depend on the selection of the full face.

Regarding the embodiment shown in FIG. 2, projection faces are packed in a regular CMP layout without guard bands (or padding) 202/204. Regarding the embodiment shown in FIG. 3, projection faces are packed in a hemisphere CMP layout without guard bands (or padding) 302/304. However, the projection-based frame IMG after coding may have artifacts due to discontinuous layout boundaries of the CMP layout (which may be a regular CMP layout or a hemisphere CMP layout) and/or discontinuous edges of the CMP layout (which may be a regular CMP layout or a hemisphere CMP layout). For example, the CMP layout without guard bands (or padding) has a top discontinuous layout boundary, a bottom discontinuous layout boundary, a left discontinuous layout boundary, and a right discontinuous layout boundary. In addition, there is at least one image content discontinuous edge between two adjacent projection faces packed in the CMP layout without guard bands (or padding). Taking the cube-based projection layout 202/204 for example, one discontinuous edge exists between one face boundary of the bottom face "3" and one face boundary of the left face "5", one discontinuous edge exists between one face boundary of the back face "1" and one face boundary of the front face "0", and one discontinuous edge exists between one face boundary of the top face "2" and one face boundary of the right face "4". Taking the cube-based projection layout 302/304 for example, one discontinuous edge exists between one face boundary of the bottom face "3" and one face boundary of the left face "5", and one discontinuous edge exists between one face boundary of the right face "4" and one face boundary of the top face "2".

To address this issue, the 360 VR projection layout L_VR may be set by a cube-based projection layout with guard bands (or padding). For example, around layout boundaries and/or discontinuous edges, additional guard bands generated by, for example, pixel padding may be inserted for reducing the seam artifacts. Alternatively, around layout boundaries and/or continuous edges, additional guard bands generated by, for example, pixel padding may be inserted.

In this embodiment, the conversion circuit 114 determines a guard band configuration of the projection-based frame IMG that consists of projection faces derived from cube-based projection (e.g., regular cubemap projection shown in FIG. 2 or hemisphere cubemap projection shown in FIG. 3), and the video encoder 116 signals syntax element(s) SE associated with the guard band configuration of the projection-based frame IMG via the bitstream BS. Hence, the video decoder 122 can parse the syntax element(s) SE associated with the guard band configuration from the bitstream BS.

For better understanding of technical features of the present invention, one exemplary syntax signaling method is described as below. The video encoder 116 may employ the proposed syntax signaling method to signal syntax element(s) SE indicative of configuration information of guard bands added by the conversion circuit 114, and the video decoder 122 may parse syntax element(s) SE' signaled by one proposed syntax signaling method employed by the video encoder 116 and may provide the graphic rendering circuit 124 (particularly, conversion circuit 125) with the parsed syntax element(s) SE', such that the graphic rendering circuit 124 (particularly, conversion circuit 125) is informed of the configuration information of guard bands added by the conversion circuit 114. In this way, when determining an image content of a viewport area selected by a user, the conversion circuit 125 can refer to the configuration information of guard bands to perform transformation correctly. Ideally, syntax element(s) SE encoded into the bitstream BS by the video encoder 116 are the same as the syntax element(s) SE' parsed from the bitstream BS by the video decoder 122.

It should be noted that the descriptors in the following exemplary syntax table specify the parsing process of each syntax element. For example, the syntax elements could be coded by fixed length coding (e.g., u(n)). Taking the descriptor u(n) for example, it describes an unsigned integer using n bits. However, this is for illustrative purposes only, and is not meant to be a limitation of the present invention. In practice, the syntax elements may be coded by fixed length coding (e.g., f(n), i(n) or u(n)) and/or variable length coding (e.g., ce(v), se(v) or ue(v)). The descriptor f(n) means a fixed-pattern bit string using n bits written (from left to right) with the left bit first. The descriptor i(n) means a signed integer using n bits. The descriptor u(n) means an unsigned integer using n bits. The descriptor ce(v) means a context-adaptive variable-length entropy-coded syntax element with the left bit first. The descriptor se(v) means a signed integer Exp-Golomb-coded syntax element with the left bit first. The syntax element ue(v) means an unsigned integer Exp-Golomb-coded syntax element with the left bit first.

In accordance with a proposed syntax signaling method, the following syntax table may be employed.

| | Descriptor |
|---|---|
| generalized_cubemap_projection ( payloadSize ) { | |
| ... | |
|    gcmp_guard_band_flag | u(1) |
|    if( gcmp_guard_band_flag ) { | |
|       ... | |
|       gcmp_guard_band_boundary_exterior_flag | u(1) |
|       gcmp_guard_band_samples_minus1 | u(4) |
|    } | |
| ... | |
| } | |

The syntax element gcmp_guard_band_flag is arranged to indicate whether a projection-based frame (e.g., IMG or IMG') contains at least one guard band. If the syntax element gcmp_guard_band_flag is equal to 0, it indicates that the coded picture does not contain guard band areas. If the syntax element gcmp_guard_band_flag is equal to 1, it indicates that the coded picture contains guard band area (s) for which the size(s) are specified by the syntax element gcmp_guard_band_samples_minus1.

The syntax element gcmp_guard_band_boundary_exterior_flag is arranged to indicate whether at least one guard band packed in the projection-based frame (e.g., IMG or IMG') includes guard bands that act as boundaries of the cube-based projection layout.

The syntax element gcmp_guard_band_samples_minus1 is arranged to provide size information of each guard band packed in the projection-based frame (e.g., IMG or IMG'). For example, gcmp_guard_band_samples_minus1 plus 1 specifies the number of guard band samples, in units of luma samples, used in the cubemap projected picture. When the parameter ChromaFormatIdc is equal to 1 (4:2:0 chroma format) or 2 (4:2:2 chroma format), gcmp_guard_band_samples_minus1 plus 1 shall correspond to an even number of luma samples. That is, when the 4:2:0 chroma format or 4:2:2 chroma format is used, gcmp_guard_band_samples_minus1 plus 1 shall correspond to an even number of luma samples.

Figure 4:
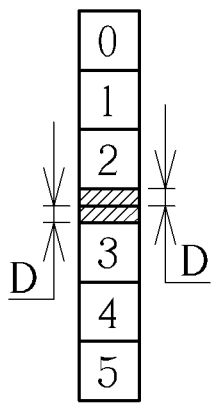
Figure 4:
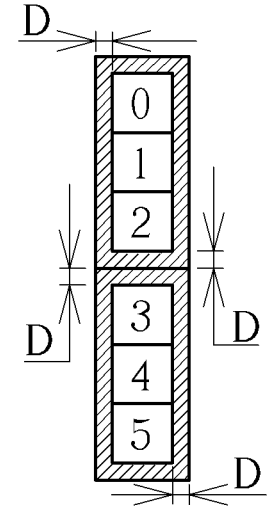

FIGS. 4-6 are diagrams illustrating one specification of a combination of two syntax elements gcmp_packing_type and gcmp_guard_band_boundary_exterior_flag according to an embodiment of the present invention. In this example, the syntax element gcmp_packing_type specifies a packing type of packing of projection faces in a cube-based projection layout, and further specifies a pre-defined arrangement of position indexes assigned to face positions under the selected packing type. When the value of gcmp_packing_type is in the range of 0 to 3, inclusive, regular cubemap packing with six faces is used, where each packing type is associated with six face positions assigned with position indexes {0, 1, 2, 3, 4, 5}, respectively. When gcmp_packing_type is 4 or 5, hemisphere cubemap packing with one full face and four half faces is used, where each packing type is associated with five face positions assigned with position indexes {0, 1, 2, 3, 4}, respectively. The value of gcmp_packing_type shall be in the range of 0 to 5, inclusive. Other values for gcmp_packing_type are reserved for future use. Furthermore, a syntax element gcmp_face_index[i] (not shown) may specify a face index for a position index i under a packing type specified by the syntax element gcmp_packing_type.

Taking the regular cubemap projection for example, the front face may be assigned with a face index gcmp_face_index[i]==0, the back face may be assigned with a face index gcmp_face_index[i]==1, the top face may be assigned with a face index gcmp_face_index[i]==2, the bottom face may be assigned with a face index gcmp_face_index[i]==3, the right face may be assigned with a face index gcmp_face_index[i]==4, and the left face may be assigned with a face index gcmp_face_index[i]==5. When the syntax element gcmp_packing_type is set by 0, 1, 2, or 3, the syntax element gcmp_face_index[i] specifies a face index of a projection face (e.g., front face "0", back face "1", top face "2", bottom face "3", right face "4", or left face "5" shown in FIG. 2), where the projection face with the face index specified by the syntax element gcmp_face_index[i] is packed at a face position with the position index i under the selected packing type.

Taking the hemisphere cubemap projection for example, the front full face may be assigned with a face index gcmp_face_index[i]==0, the top half face may be assigned with a face index gcmp_face_index[i]==2, the bottom half face may be assigned with a face index gcmp_face_index[i]==3, the right half face may be assigned with a face index gcmp_face_index[i]==4, and the left half face may be assigned with a face index gcmp_face_index[i]==5. When the syntax element gcmp_packing_type is set by 4 or 5, the syntax element gcmp_face_index[i] (not shown) specifies a face index of a projection face (e.g., front face "0", back face "1", top face "2", bottom face "3", right face "4", or left face "5" shown in FIG. 3), where the projection face with the face index specified by the syntax element gcmp_face_index[i] is packed at a face position with the position index i under the selected packing type.

Since the present invention focuses on the guard band syntax signaling, further description of packing of projection faces derived from cube-based projection is omitted here for brevity.

As shown in FIG. 4, when the syntax element gcmp_packing_type is set by 0 and the syntax element gcmp_guard_band_boundary_exterior_flag is set by 0 under a condition that the syntax element gcmp_guard_band_flag is set by 1, a first guard band is added to a bottom face boundary of a first projection face packed at a face position with the position index i=2, and a second guard band is added to a top face boundary of a second projection face packed at a face position with the position index i=3, where the first guard band and the second guard band have the same guard band size D as specified by gcmp_guard_band_samples_minus1 plus 1. If the bottom face boundary of the first projection face directly connects with the top face boundary of the second projection face, an edge (e.g., a discontinuous edge or a continuous edge) exists between the first projection face and the second projection face. Guard bands can be added to the edge between the first projection face and the second projection face. For example, regarding a cube in a 3D space, the bottom face boundary of the first projection face (which is one square face of the cube) may be connected with or may not be connected with the top face boundary of the second projection face (which is another square face of the cube); and regarding a cube-based projection layout on a 2D plane, the bottom face boundary of the first projection face is parallel with the top face boundary of the second projection face, and the first guard band and the second guard band are both between the first projection face and the second projection face for isolating the bottom face boundary of the first projection face from the top face boundary of the second projection face, where the first guard band connects with the bottom face boundary of the first projection face and the second guard band, and the second guard band connects with the first guard band and the top face boundary of the second projection face. Hence, the width of one guard band area (which consists of the first guard band and the second guard) inserted between the first projection face (which is packed at the face position with the position index i=2) and the second projection face (which is packed at the face position with the position index i=3) is equal to 2*D.

As shown in FIG. 4, when the syntax element gcmp_packing_type is set by 0 and the syntax element gcmp_guard_band_boundary_exterior_flag is set by 1 under a condition that the syntax element gcmp_guard_band_flag is set by 1, a first guard band is added to a bottom face boundary of a projection face packed at a face position with the position index i=2, a second guard band is added to a top face boundary of a projection face packed at a face position with the position index i=3, a third guard band is added to a top face boundary of a projection face packed at a face position with the position index i=0, a fourth guard band is added to a bottom face boundary of a projection face packed at a face position with the position index i=5, a fifth guard band is added to left face boundaries of projection faces packed at face positions with the position indexes i=0-5, and a sixth guard band is added to right face boundaries of projection faces packed at face positions with the position indexes i=0-5, where the first guard band, the second guard band, the third guard band, the fourth guard band, the fifth guard band, and the sixth guard band have the same guard band size D as specified by gcmp_guard_band_samples_minus1 plus 1. Specifically, the third guard band, the fourth guard band, the fifth guard band, and the sixth guard band act as boundaries of the cube-based projection layout. In addition, the width of one guard band area (which consists of two guard bands) inserted between two projection faces (which are packed at face positions with position indexes i=2 and i=3) is equal to 2*D.

Since a person skilled in the art can readily understand details of other guard band configurations shown in FIG. 5 and FIG. 6 after reading above paragraphs, further description is omitted here for brevity.

As mentioned above, the syntax element gcmp_guard_band_samples_minus1 is arranged to provide size information of each guard band packed in the projection-based frame (e.g., IMG or IMG'). In some embodiments of the present invention, the decoder-side conversion circuit 125 may refer to the syntax element gcmp_guard_band_samples_minus1 parsed from the bitstream BS to do computation for certain applications under one of the guard band configurations shown in FIGS. 4-6.

For example, the size information specified by the the syntax element gcmp_guard_band_samples_minus1 may be involved in calculation of a size of each of the projection faces packed in the cube-based projection layout with guard bands. Inputs of this process may include width pictureWidth and height pictureHeight of a projection-based frame (e.g., decoded frame IMG'). Outputs of this process may include width faceWidth and height faceHeight of a projection face packed in the projection-based frame (e.g., decoded frame IMG').

The outputs may be derived as follows:

```
gcmpPicWidth = pictureWidth
gcmpPicHeight = pictureHeight
gcmpGuardBandSamples = gcmp_guard_band_samples_minus1 + 1
if           (gcmp_guard_band_flag           &&
gcmp_guard_band_boundary_exterior_flag ) {
    gcmpPicWidth = pictureWidth - 2 * gcmpGuardBandSamples
    gcmpPicHeight = pictureHeight - 2 * gcmpGuardBandSamples
}
if (gcmp_packing_type = = 0 ) {
    if (gcmp_guard_band_flag )
        gcmpPicHeight = gcmpPicHeight - 2 * gcmpGuardBandSamples
        faceWidth = gcmpPicWidth
        faceHeight = gcmpPicHeight / 6
} else if (gcmp_packing_type = = 1 ) {
    if (gcmp_guard_band-flag )
        gcmpPicWidth = gcmpPicWidth - 2 * gcmpGuardBandSamples
        faceWidth = gcmpPicWidth / 2
        faceHeight = gcmpPicHeight / 3
} else if (gcmp_packing_type = = 2 ) {
    if (gcmp_guard_band_flag )
        gcmpPicHeight = gcmpPicHeight - 2 * gcmpGuardBandSamples
        faceWidth = gcmpPicWidth / 3
        faceHeight = gcmpPicHeight / 2
} else if (gcmp_packing_type = = 3 ) {
    if (gcmp_guard_band_flag )
        gcmpPicWidth = gcmpPicWidth - 2 * gcmpGuardBandSamples
        faceWidth = gcmpPicWidth / 6
        faceHeight = gcmpPicHeight
} else if (gcmp_packing_type = = 4 ) {
    if (gcmp_guard_band_flag )
        gcmpPicWidth = gcmpPicWidth - 2 * gcmpGuardBandSamples
        faceWidth = gcmpPicWidth / 3
        faceHeight = gcmpPicHeight
} else if (gcmp_packing_type = = 5 ) {
    if (gcmp_guard_band_flag )
        gcmpPicHeight = gcmpPicHeight - 2 * gcmpGuardBandSamples
        faceWidth = gcmpPicWidth
        faceHeight = gcmpPicHeight / 3
}
```

For another example, the size information specified by the the syntax element gcmp_guard_band_samples_minus1 may be involved in conversion from a sample position within the decoded frame IMG' to a local sample location within one of the projection faces packed in the cube-based projection layout with guard bands. Inputs of this process may include width faceWidth and height faceHeight of a projection face, and may further include a sample location (hPos, vPos) of the projection-based frame (e.g., decoded frame IMG'). An output of this process may include a local sample location (hPosFace, vPosFace) of a projection face packed in the projection-based frame (e.g., decoded frame IMG').

The output may be derived as follows:

```
gbSize = gcmp_guard_band_samples_minus1 + 1
tmpHorPos = hPos
tmpVerPos = vPos
if (gcmp_guard_band_flag ) {
    if (gcmp_guard_band_boundary_exterior_flag ) {
        tmpHorPos = hPos - gbSize
        tmpVerPos = vPos - gbSize
    }
    if (gcmp_packing_type = = 0 )
        tmpVerPos = tmpVerPos < 3 * faceHeight ? tmpVerPos : tmpVerPos - 2 * gbSize
        else if (gcmp_packing_type = = 1 )
            tmpHorPos = tmpHorPos < faceWidth ? tmpHorPos : tmpHorPos - 2 * gbSize
        else if (gcmp_packing_type = = 2 )
            tmpVerPos = tmpVerPos < faceHeight ? tmpVerPos : tmpVerPos - 2 * gbSize
        else if (gcmp_packing_type = = 3 )
            tmpHorPos = tmpHorPos < 3 * faceWidth ? tmpHorPos : tmpHorPos - 2 * gbSize
        else if (gcmp_packing_type = = 4 )
            tmpHorPos = tmpHorPos < faceWidth / 2 ? tmpHorPos : tmpHorPos < 2.5 * faceWidth + gbSize ? tmpHorPos - gbSize : tmpHorPos - 2 * gbSize
        else if (gcmp_packing_type = = 5 )
            tmpVerPos = tmpVerPos < faceHeight / 2 ? tmpVerPos : tmpVerPos
```

```
< 2.5 * faceHeight + gbSize ? tmpVerPos - gbSize : tmpVerPos - 2 *
gbSize
}
w = Floor (tmpHorPos / faceWidth)
h = Floor (tmpVerPos / faceHeight)
hPosFace = tmpHorPos - w * faceWidth
vPosFace = tmpVerPos - h * faceHeight
```

Figure 7:
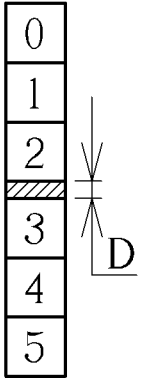
Figure 7:
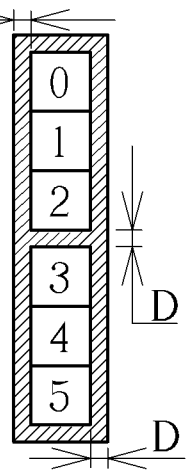

FIGS. 7-9 are diagrams illustrating another specification of a combination of two syntax elements gcmp_packing_type and gcmp_guard_band_boundary_exterior_flag according to an embodiment of the present invention. Like the example shown in FIGS. 4-6, the syntax element gcmp_packing_type specifies a packing type of packing of projection faces in a cube-based projection layout, and further specifies a pre-defined arrangement of position indexes assigned to face positions under the selected packing type. Hence, when the value of gcmp_packing_type is in the range of 0 to 3, inclusive, regular cubemap packing with six faces is used, where each packing type is associated with six face positions assigned with position indexes {0, 1, 2, 3, 4, 5}, respectively. When gcmp_packing_type is 4 or 5, hemisphere cubemap packing with one full face and four half faces is used, where each packing type is associated with five face positions assigned with position indexes {0, 1, 2, 3, 4}, respectively. Furthermore, a syntax element gcmp_face_index[i] (not shown) may specify a face index for a position index i under a packing type specified by the syntax element gcmp_packing_type.

Since the present invention focuses on guard band syntax signaling, further description of packing of projection faces derived from cube-based projection is omitted here for brevity.

The major difference between the guard band configurations shown in FIGS. 4-6 and the guard band configurations shown in FIGS. 7-9 is that a single guard band is added to an edge (e.g., a discontinuous edge or a continuous edge) between two adjacent projection faces packed in a cube-based projection layout with the value of gcmp_packing_type in the range of 0 to 3. As shown in FIG. 7, when the syntax element gcmp_packing_type is set by 0 and the syntax element gcmp_guard_band_boundary_exterior_flag is set by 0 under a condition that the syntax element gcmp_guard_band_flag is set by 1, a guard band is inserted between a bottom face boundary of a first projection face packed at a face position with the position index i=2 and a top face boundary of a second projection face packed at a face position with the position index i=3, where the guard band has the guard band size D as specified by gcmp_guard_band_samples_minus1 plus 1. If the bottom face boundary of the first projection face directly connects with the top face boundary of the second projection face, an edge (e.g., a discontinuous edge or a continuous edge) exists between the first projection face and the second projection face. One guard band can be added to the edge between the first projection face and the second projection face. For example, regarding a cube in a 3D space, the bottom face boundary of the first projection face (which is one square face of the cube) may be connected with or may not be connected with the top face boundary of the second projection face (which is another square face of the cube); and regarding a cube-based projection layout on a 2D plane, the bottom face boundary of the first projection face is parallel with the top face boundary of the second projection face, and the guard band is between the first projection face and the second projection face for isolating the bottom face boundary of the first projection face from the top face boundary of the second projection face, where the guard band connects with the bottom face boundary of the first projection face and also connects with the top face boundary of the second projection face. Hence, the width of one guard band area (which consists of a single guard band) inserted between the first projection face (which is packed at the face position with the position index i=2) and the second projection face (which is packed at the face position with the position index i=3) is equal to D.

As shown in FIG. 7, when the syntax element gcmp_packing_type is set by 0 and the syntax element gcmp_guard_band_boundary_exterior_flag is set by 1 under a condition that the syntax element gcmp_guard_band_flag is set by 1, a first guard band is added between a bottom face boundary of a projection face packed at a face position with the position index i=2 and a top face boundary of a projection face packed at a face position with the position index i=3, a second guard band is added to a top face boundary of a projection face packed at a face position with the position index i=0, a third guard band is added to a bottom face boundary of a projection face packed at a face position with the position index i=5, a fourth guard band is added to left face boundaries of projection faces packed at face positions with the position indexes i=0-5, and a fifth guard band is added to right face boundaries of projection faces packed at face positions with the position indexes i=0-5, where the first guard band, the second guard band, the third guard band, the fourth guard band, and the fifth guard band have the same guard band size D as specified by gcmp_guard_band_samples_minus1 plus 1. Specifically, the second guard band, the third guard band, the fourth guard band, and the fifth guard band act as boundaries of the cube-based projection layout. In addition, the width of one guard band area (which consists of a single guard band) inserted between two projection faces (which are packed at the face position with the position index i=2 and i=3) is equal to D.

Since a person skilled in the art can readily understand details of other guard band configurations shown in FIG. 8 and FIG. 9 after reading above paragraphs, further description is omitted here for brevity.

As mentioned above, the syntax element gcmp_guard_band_samples_minus1 is arranged to provide size information of each guard band packed in the projection-based frame (e.g., IMG or IMG'). In some embodiments of the present invention, the decoder-side conversion circuit 125 may refer to the syntax element gcmp_guard_band_samples_minus1 parsed from the bitstream BS to do computation for certain applications under one of the guard band configurations shown in FIGS. 7-9.

For example, the size information specified by the the syntax element gcmp_guard_band_samples_minus1 may be involved in calculation of a size of each of the projection faces packed in the cube-based projection layout with guard bands. Inputs of this process may include width pictureWidth and height pictureHeight of a projection-based frame (e.g., decoded frame IMG'). Outputs of this process may include width faceWidth and height faceHeight of a projection face packed in the projection-based frame (e.g., decoded frame IMG').

The outputs may be derived as follows:

```
gcmpPicWidth = pictureWidth
gcmpPicHeight = pictureHeight
gcmpGuardBandSamples = gcmp_guard_band_samples_minus1 + 1
if              (gcmp_guard_band_flag               &&
gcmp_guard_band_boundary_exterior_flag ) {
    gcmpPicWidth = pictureWidth − 2 * gcmpGuardBandSamples
    gcmpPicHeight = pictureHeight − 2 * gcmpGuardBandSamples
}
if (gcmp_packing_type = = 0 ) {
    if (gcmp_guard_band_flag )
        gcmpPicHeight = gcmpPicHeight − gcmpGuardBandSamples
        faceWidth = gcmpPicWidth
        faceHeight = gcmpPicHeight / 6
} else if (gcmp_packing_type = = 1 ) {
    if (gcmp_guard_band_flag )
        gcmpPicWidth = gcmpPicWidth − gcmpGuardBandSamples
        faceWidth = gcmpPicWidth / 2
        faceHeight = gcmpPicHeight / 3
} else if (gcmp_packing_type = = 2 ) {
    if (gcmp_guard_band_flag )
        gcmpPicHeight = gcmpPicHeight − gcmpGuardBandSamples
        faceWidth = gcmpPicWidth / 3
        faceHeight = gcmpPicHeight / 2
} else if (gcmp_packing_type = = 3 ) {
    if (gcmp_guard_band_flag )
        gcmpPicWidth = gcmpPicWidth − gcmpGuardBandSamples
        faceWidth = gcmpPicWidth / 6
        faceHeight = gcmpPicHeight
} else if (gcmp_packing_type = = 4 ) {
    if (gcmp_guard_band_flag )
        gcmpPicWidth = gcmpPicWidth − 2 * gcmpGuardBandSamples
        faceWidth = gcmpPicWidth / 3
        faceHeight = gcmpPicHeight
} else if (gcmp_packing_type = = 5 ) {
    if (gcmp_guard_band_flag )
        gcmpPicHeight = gcmpPicHeight − 2 * gcmpGuardBandSamples
        faceWidth = gcmpPicWidth
        faceHeight = gcmpPicHeight / 3
}
```

For another example, the size information specified by the the syntax element gcmp_guard_band_samples_minus1 may be involved in conversion from a sample position within the decoded frame IMG' to a local sample location within one of the projection faces packed in the cube-based projection layout with guard bands. Inputs of this process may include width faceWidth and height faceHeight of a projection face, and may further include a sample location (hPos, vPos) of the projection-based frame (e.g., decoded frame IMG'). An output of this process may include a local sample location (hPosFace, vPosFace) of a projection face packed in the projection-based frame (e.g., decoded frame IMG').

The output may be derived as follows:

```
gbSize = gcmp_guard_band_samples_minus1 + 1
tmpHorPos = hPos
tmpVerPos = vPos
if (gcmp_guard_band_flag ) {
    if (gcmp_guard_band_boundary_exterior_flag ) {
        tmpHorPos = hPos − gbSize
        tmpVerPos = vPos − gbSize
    }
    if (gcmp_packing_type = = 0 )
        tmpVerPos = tmpVerPos < 3 * faceHeight ? tmpVerPos : tmpVerPos
− gbSize
        else if (gcmp_packing_type = = 1 )
            tmpHorPos = tmpHorPos < faceWidth ? tmpHorPos : tmpHorPos
− gbSize
        else if (gcmp_packing_type = = 2 )
            tmpVerPos = tmpVerPos < faceHeight ? tmpVerPos : tmpVerPos
− gbSize
        else if (gcmp_packing_type = = 3 )
            tmpHorPos = tmpHorPos < 3 * faceWidth ? tmpHorPos : tmpHorPos
− gbSize
        else if (gcmp_packing_type = = 4 )
            tmpHorPos = tmpHorPos < faceWidth / 2 ? tmpHorPos : tmpHorPos
< 2.5 * facewidth + gbSize ? tmpHorPos − gbSize : tmpHorPos − 2 *
gbSize
        else if (gcmp_packing_type = = 5 )
            tmpVerPos = tmpVerPos < faceHeight / 2 ? tmpVerPos : tmpVerPos
```

```
< 2.5 * faceHeight + gbSize ? tmpVerPos - gbSize : tmpVerPos - 2 *
gbSize
}
w = Floor (tmpHorPos / faceWidth)
h = Floor (tmpVerPos / faceHeight)
hPosFace = tmpHorPos - w * faceWidth
vPosFace = tmpVerPos - h * faceHeight
```

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method comprising:
decoding a part of a bitstream to generate a decoded frame, wherein the decoded frame is a projection-based frame that comprises projection faces packed in a cube-based projection layout, and at least a portion of a 360-degree content of a sphere is mapped to the projection faces via cube-based projection; and
parsing syntax elements from the bitstream, wherein one of the syntax elements is arranged to indicate whether the projection-based frame contains at least one guard band; and another of the syntax elements is distinct from said one of the syntax elements and is arranged to indicate whether said at least one guard band packed in the projection-based frame comprises one or more guard bands that act as layout boundaries of the cube-based projection layout, where none of the layout boundaries is between two of the projection faces packed in the cube-based projection layout;
wherein parsing the syntax elements from the bitstream comprises:
parsing said one of the syntax elements from the bitstream; and
in response to said one of the syntax elements being set to indicate that the projection-based frame contains said at least one guard band, parsing said another of the syntax elements from the bitstream, wherein said one of the syntax elements and said another of the syntax elements are separate syntax elements signaled via the bitstream.

2. The video decoding method of claim 1, wherein packing of the projection faces is selected from a group consisting of packing of regular cubemap projection faces and packing of hemisphere cubemap projection faces.

3. The video decoding method of claim 1, wherein the projection faces correspond to faces of an object in a three-dimensional space, respectively, and comprise a first projection face and a second projection face, where the object is a cube or a hemisphere cube; said at least one guard band packed in the cube-based projection layout comprises a first guard band, where regarding the cube-based projection layout on a two-dimensional plane, one face boundary of the first projection face is parallel with one face boundary of the second projection face, and the first guard band is between the first projection face and the second projection face.

4. The video decoding method of claim 3, wherein said at least one guard band further comprises a second guard band, where regarding the cube-based projection layout on the two-dimensional plane, the first guard band and the second guard band are both between the first projection face and the second projection face for isolating said one face boundary of the first projection face from said one face boundary of the second projection face, the first guard band connects with said one face boundary of the first projection face and the second guard band, and the second guard band connects with the first guard band and said one face boundary of the second projection face.

5. The video decoding method of claim 3, wherein regarding the cube-based projection layout on the two-dimensional plane, the first guard band connects with said one face boundary of the first projection face and said one face boundary of the second projection face for isolating said one face boundary of the first projection face from said one face boundary of the second projection face.

6. The video decoding method of claim 1, wherein yet another of the syntax elements is arranged to provide size information of each of said at least one guard band.

7. The video decoding method of claim 6, wherein said size information is involved in calculation of a size of each of the projection faces, or is involved in conversion from a sample position within the projection-based frame to a local sample location within one of the projection faces.

8. An electronic device comprising:
a decoding circuit, arranged to decode a part of a bitstream to generate a decoded frame, and parse syntax elements from the bitstream;
wherein the decoded frame is a projection-based frame that comprises projection faces packed in a cube-based projection layout, at least a portion of a 360-degree content of a sphere is mapped to the projection faces via cube-based projection, and one of the syntax elements is arranged to indicate whether the projection-based frame contains at least one guard band; and another of the syntax elements is distinct from said one of the syntax elements and is arranged to indicate whether said at least one guard band packed in the projection-based frame comprises one or more guard bands that act as layout boundaries of the cube-based projection layout, where none of the layout boundaries is between two of the projection faces packed in the cube-based projection layout;
wherein the decoding circuit is arranged to:
parse said one of the syntax elements from the bitstream; and
in response to said one of the syntax elements being set to indicate that the projection-based frame contains said at least one guard band, parse said another of the syntax elements from the bitstream, wherein said one of the syntax elements and said another of the syntax elements are separate syntax elements signaled via the bitstream.

9. The electronic device of claim 8, wherein packing of the projection faces is selected from a group consisting of packing of regular cubemap projection faces and packing of hemisphere cubemap projection faces.

10. The electronic device of claim 8, wherein the projection faces correspond to faces of an object in a three-dimensional space, respectively, and comprise a first projection face and a second projection face, where the object is a cube or a hemisphere cube; said at least one guard band packed in the cube-based projection layout comprises a first guard band, where regarding the cube-based projection layout on a two-dimensional plane, one face boundary of the first projection face is parallel with one face boundary of the second projection face, and the first guard band is between said one face boundary of the first projection face and said one face boundary of the second projection face.

11. The electronic device of claim 10, wherein said at least one guard band further comprises a second guard band, where regarding the cube-based projection layout on the two-dimensional plane, the first guard band and the second guard band are both between the first projection face and the second projection face for isolating said one face boundary of the first projection face from said one face boundary of the second projection face, the first guard band connects with said one face boundary of the first projection face and the second guard band, and the second guard band connects with the first guard band and said one face boundary of the second projection face.

12. The electronic device of claim 10, wherein regarding the cube-based projection layout on the two-dimensional plane, the first guard band connects with said one face boundary of the first projection face and said one face boundary of the second projection face for isolating said one face boundary of the first projection face from said one face boundary of the second projection face.

13. The electronic device of claim 8, wherein yet another of the syntax elements is arranged to provide size information of each of said at least one guard band.

14. The electronic device of claim 13, wherein said size information is involved in calculation of a size of each of the projection faces, or is involved in conversion from a sample position within the projection-based frame to a local sample location within one of the projection faces.

15. A video encoding method comprising:
encoding a projection-based frame to generate a part of a bitstream, wherein at least a portion of a 360-degree content of a sphere is mapped to projection faces via cube-based projection, and the projection-based frame has the projection faces packed in a cube-based projection layout; and
signaling syntax elements via the bitstream, wherein one of the syntax elements is arranged to indicate whether the projection-based frame contains at least one guard band; and another of the syntax elements is distinct from said one of the syntax elements and is arranged to indicate whether said at least one guard band packed in the projection-based frame comprises one or more guard bands that act as layout boundaries of the cube-based projection layout, where none of the layout boundaries is between two of the projection faces packed in the cube-based projection layout;
wherein signaling the syntax elements via the bitstream comprises:
signaling said one of the syntax elements via the bitstream; and
in response to said one of the syntax elements being set to indicate that the projection-based frame contains said at least one guard band, signaling said another of the syntax elements via the bitstream, wherein said one of the syntax elements and said another of the syntax elements are separate syntax elements signaled via the bitstream.

* * * * *